United States Patent
Park et al.

(10) Patent No.: US 8,679,661 B2
(45) Date of Patent: Mar. 25, 2014

(54) POUCH TYPE SECONDARY BATTERY

(75) Inventors: Heechan Park, Daejeon (KR); Sangbum Kim, Seoul (KR)

(73) Assignee: SK Innovation Co., Ltd. (KR)

(*) Notice: Subject to any disclaimer, the term of this patent is extended or adjusted under 35 U.S.C. 154(b) by 108 days.

(21) Appl. No.: 13/431,230

(22) Filed: Mar. 27, 2012

(65) Prior Publication Data
US 2013/0122336 A1 May 16, 2013

(30) Foreign Application Priority Data
Nov. 15, 2011 (KR) .................. 10-2011-0118641

(51) Int. Cl.
*H01M 2/12* (2006.01)

(52) U.S. Cl.
USPC ............... 429/56; 429/82; 429/162; 429/176; 429/185

(58) Field of Classification Search
USPC .......................................... 429/56
See application file for complete search history.

(56) References Cited

U.S. PATENT DOCUMENTS

| | | | |
|---|---|---|---|
| 4,678,725 A * | 7/1987 | Kikuchi et al. | 429/53 |
| 6,653,018 B2 * | 11/2003 | Takahashi et al. | 429/185 |
| 7,122,276 B2 * | 10/2006 | Gu | 429/162 |

FOREIGN PATENT DOCUMENTS

| | | |
|---|---|---|
| KR | 10-2003-0067565 | 8/2003 |
| KR | 20050031307 | 4/2005 |

* cited by examiner

*Primary Examiner* — John S Maples
(74) *Attorney, Agent, or Firm* — Cantor Colburn LLP

(57) ABSTRACT

Provided is a pouch type secondary battery. In more detail, a pouch type secondary battery includes an electrode assembly, a pouch type battery case, a sealing part, and an exhaust part, wherein the exhaust part is formed to have adhesion weaker than that of the sealing part to release the sealing of the exhaust part when the pouch type secondary battery is swollen due to high pressure generated within the secondary battery under the conditions of overheating such as overcharging, internal short, and the like, thereby discharging materials in the pouch type secondary battery to the outside so as to secure safety of the pouch type secondary battery.

2 Claims, 5 Drawing Sheets

(a)

(b)

(a)

(b)

POUCH TYPE SECONDARY BATTERY

CROSS-REFERENCE TO RELATED APPLICATIONS

This application claims priority under 35 U.S.C. §119 to Korean Patent Application No. 10-2011-0018641, filed on Nov. 15, 2011, in the Korean Intellectual Property Office, the disclosure of which is incorporated herein by reference in its entirety.

TECHNICAL FIELD

The present invention relates to a pouch type secondary battery, and more particularly, to a pouch type secondary battery configured to include an electrode assembly, a pouch type battery case, a sealing part, and an exhaust part, wherein the exhaust part includes an exhaust member inserted into a predetermined region of a bonding surface of the sealing part and is formed to have adhesion weaker than that of the sealing part to release the sealing of the exhaust part having a relatively weaker adhesion than that of the sealing part when the pouch type secondary battery is swollen due to high pressure generated within the secondary battery under the conditions of overheating such as overcharging, internal short, and the like, thereby discharging materials in the pouch type secondary battery to the outside so as to secure safety of the pouch type secondary battery.

BACKGROUND

Recently, a rechargeable secondary battery has been widely used as an energy source for wireless mobile devices.

In addition, the secondary battery has been prominent as a power source of an electric vehicle (EV), a hybrid electric vehicle (HEV), etc., that have been suggested as a scheme for solving air pollution of an existing gasoline vehicle, diesel vehicle, etc., using a fossil fuel.

Small-sized mobile devices use one or more battery cells per one device. In contrast, due to necessity of high output and large capacity, middle and large-sized devices such as a vehicle, etc., use a middle and large-sized battery pack in which a plurality of battery cells are electrically interconnected.

In this case, it is preferable to manufacture the middle and large-sized battery pack at the size and weight as small as possible. Therefore, a square type battery, a pouch type battery, or the like, that can be highly integrated and have a small weight compared with capacity have been mainly used as a battery cell of the middle and large-sized battery pack. Among those, the pouch type battery having a small weight, an electrolyte that is less likely to be leaked and inexpensive manufacturing costs has been largely interested.

As a unit battery (battery cell) of a middle and large-sized battery pack, a nickel-hydrogen secondary battery has been mainly used. Recently, similar to the small battery pack, a lithium secondary battery providing high output compared with capacity has been largely researched and a portion thereof has reached commercialization.

However, the lithium secondary battery basically has low safety. In particular, the pouch type battery is a prominent candidate as a unit battery of the middle and large-sized battery pack due to various advantages as described above, but has low mechanical rigidity and a great risk of fire due to a leakage of pyrophoric materials such as an electrolyte, or the like, when a sealing part is separated.

In addition, in the pouch type secondary battery, since an electrolyte is injected into cells all of which are integrated, when each cell is overcharged, voltage increases and an electrolyte is decomposed in the cells due to overheating to generate combustible gas in the cells and increase pressure in the pouch, which leads to a swelling phenomenon that swells the pouch. Further, a cathode and an anode are short-circuited due to melting of a separator between the cathode and the anode, which causes ignition. Therefore, it is possible to secure safety of a battery.

In actual, a safety test, such as overcharging, forced discharging, or the like, and various safety tests, such as a high temperature storage test, a thermal shock test, a thermal exposure test, or the like, are performed before a completed battery is distributed in the market due to a problem of safety of a lithium secondary battery. The thermal safety test is performed by leaving a battery for several tens of minutes to several tens of hours under various temperature conditions. In this case, the battery should not be exploded and ignited. In the worst case, the sealing of the battery is released, thereby preventing the battery from being exploded and ignited.

As described above, in the pouch type secondary battery, an excessive amount of gas is generated due to overcurrent. As a result, a technology of removing a problem in which pressure in a battery is increased has been disclosed from the past.

Korean Patent No. 0560158 ("lithium secondary batter, hereinafter, referred to as related art 1) disclosed a structure of an explosion protection safety apparatus in which an outer surface of a package of a battery is partially formed with an adhesive layer to increase an internal pressure of a battery to a threshold or more and instantly rupture a package when the package is expanded, thereby preventing the battery from being exploded.

As described above, the related art 1 may solve a problem to some degree in that it is possible to prevent a cell from being suddenly exploded. As a result, since the exhaust starts when the package of a portion at which an adhesive layer is not formed is ruptured during the expansion of the cell, the strength in explosion of cell can be reduced to some degree but the cells are still likely to be exploded. Therefore, the related art 1 cannot completely solve the problem.

Therefore, at the time of the occurrence of the swelling phenomenon of the lithium secondary battery, a development of various technologies for preventing the lithium secondary battery from being exploded or ignited is needed.

RELATED ART DOCUMENT

Patent Document

Korean Patent No. 0560158 (Patent Publication Date: Mar. 16, 2006)

SUMMARY

An embodiment of the present invention is directed to providing a pouch type secondary battery including an exhaust part including an exhaust member inserted into a predetermined region of a bonding surface of the sealing part and formed to have adhesion weaker than that of the sealing part to release the sealing of the exhaust part having a relatively weaker adhesion than that of the sealing part when the pouch type secondary battery is swollen due to high pressure generated within the secondary battery under the conditions of overheating, such as overcharging, internal short, and the like, thereby discharging materials in the pouch type secondary battery to the outside so as to secure safety of the pouch type secondary battery.

In one general aspect, a pouch type secondary battery includes: an electrode assembly including a first electrode and a second electrode and a first electrode tap and a second electrode tap extending from the first electrode and the second electrode; a pouch type battery case having the electrode assembly accommodated in an inner space part thereof and sealed so that the first electrode tap and the second electrode tap are exposed to the outside; a sealing part sealed by applying a sealing member to a bonding surface at which the pouch type battery case is bonded to each other so as to be sealed; and an exhaust part including an exhaust member inserted into a predetermined region of the bonding surface of the sealing part and formed to have adhesion weaker than that of the sealing part.

The exhaust member may be a first exhaust member that is formed in a single layer of a film type.

The first exhaust member may be formed of modified polypropylene.

The exhaust member may be a second exhaust member that includes at least one exhaust layer and adhesive layers disposed on top and bottom portions of the exhaust layer to assist adhesion of the exhaust layer and is formed in a film type in which the exhaust layer and the adhesive layer are stacked.

The exhaust layer may be formed of nonwoven fabric or a material having similar adhesion and the adhesive layer is formed of polypropylene.

DETAILED DESCRIPTION OF MAIN ELEMENTS

| 1000: | pouch type secondary battery |
| 100: | electrode assembly |
| 110: | first electrode tap |
| 120: | second electrode tap |
| 200: | pouch type battery case |
| 210: | space part |
| 220: | body part |
| 230: | pouch type cover |
| 240: | flange |
| 300: | sealing part |
| 310: | sealing member |
| 400: | exhaust part |
| 410: | first exhaust member |
| 420: | second exhaust member |

-continued

| 421: | adhesive layer |
| 422: | exhaust layer |

DETAILED DESCRIPTION OF EMBODIMENTS

Hereinafter, a pouch type secondary battery 1000 according to an exemplary embodiment of the present invention having the aforementioned configuration will be described with reference to the accompanying drawings.

Figure 1:
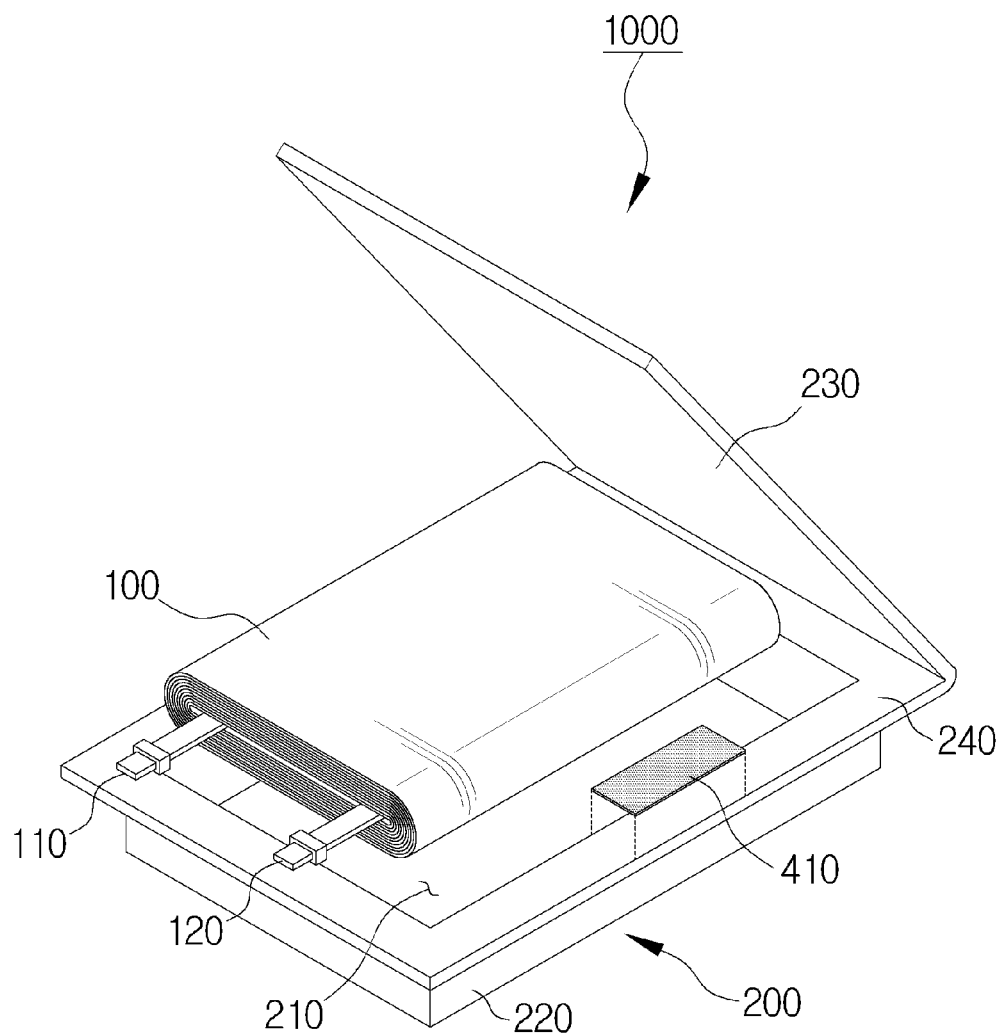
FIG. 1 is an exploded perspective view of a pouch type secondary battery according to an exemplary embodiment of the present invention.
Figure 2:
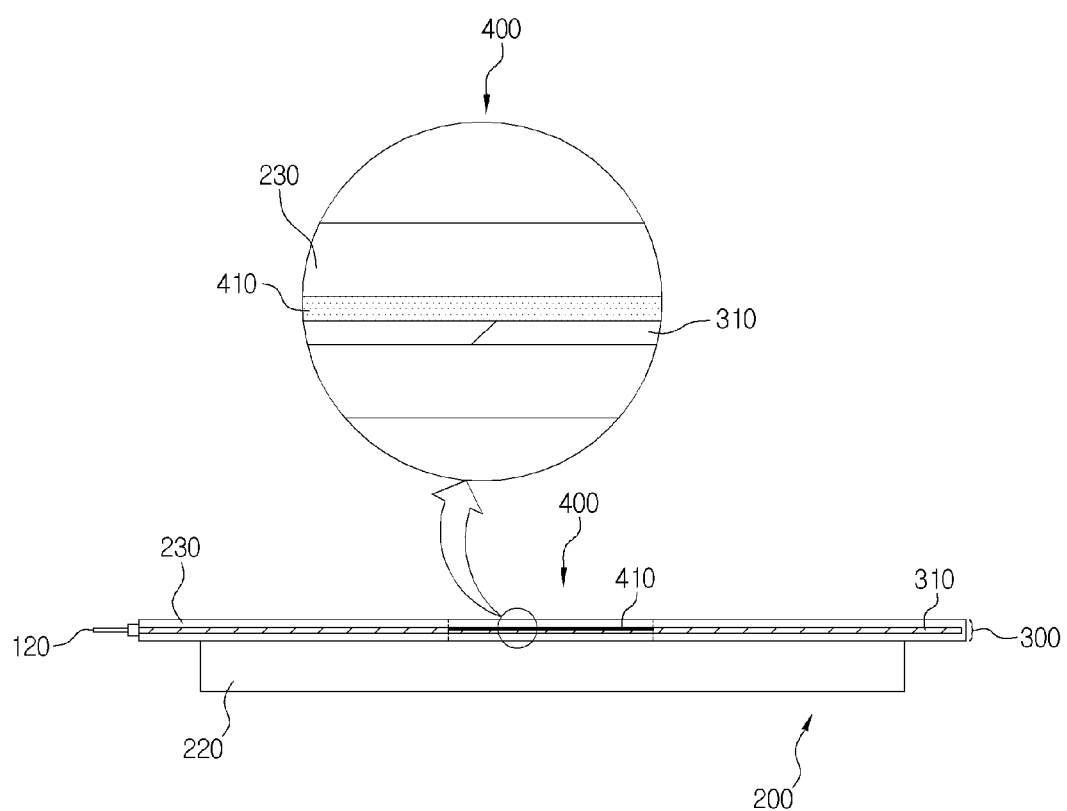
FIG. 2 is a side view showing a side on which an exhaust part is formed, in the pouch type secondary battery according to an exemplary embodiment of the present invention.

FIG. 1 is an exploded perspective view showing the pouch type secondary battery 1000 according to the exemplary embodiment of the present invention and FIG. 2 is a side view showing a side on which an exhaust part 400 is formed, in the pouch type secondary battery 1000 according to the exemplary embodiment of the present invention.

The pouch type secondary battery 1000 according to the exemplary embodiment of the present invention is largely configured to include an electrode assembly 100, a pouch type battery case 200, a sealing part 300, and an exhaust part 400.

The electrode assembly 100 includes a first electrode and a second electrode, wherein a first electrode tap 110 and a second electrode tap 120 are each formed by extending from the first electrode and the second electrode.

The electrode assembly 100 shown in FIGS. 1 to 4 has a jelly roll form in which it is wound, having a separator interposed between the first electrode and the second electrode. In addition, the electrode assembly 100 may be a stacked type electrode assembly 100 in which it is stacked, having the separator interposed between the first electrode and the second electrode but is not limited to a specific form.

In the electrode assembly 100, when the first electrode is an anode, the second electrode may be a cathode. In this case, the first electrode tap 110 may be an anode tap and the second electrode tap 120 may be a cathode tap.

Meanwhile, the pouch type battery case 200 includes a space part 210 formed therein and is sealed so that the first electrode tap 110 and the second electrode tap 120 are exposed to the outside, wherein the space part 210 has the electrode assembly 100 accommodated therein.

In detail, the pouch type battery case 200 may be configured to include a body part 220 concavely formed to include the space part 210 disposed therein and a pouch type cover 230 covering the body part 220 to seal the space part 210.

The pouch type cover 230 has one end extending from the body part 220, wherein the body part 220 is formed so that a flange 240 so as to be bonded with the pouch type cover 230 is outwardly protruded around the space part 210.

In addition, the pouch type battery case 200 is formed with the sealing part 300 by applying a sealing member 310 to the flange 240 to seal the flange 240 and the pouch type cover 230.

As described above, one end of the pouch type cover 230 is connected with the body part 220, such that the sealing part 300 sealing the space part 210 is formed at three sides of the pouch type battery case 200.

The sealing part 300 may be sealed by thermo compression and a scheme and a type of sealing the pouch type battery case 200 are not limited to the above-mentioned scheme and type and therefore, may be variously changed.

In addition, as an exemplary embodiment of the present invention, the sealing member 310 may be polypropylene. In addition, the sealing member 310 may be variously formed of resin polyvinyl chloride, polystyrene, polyethylene, non-stretched polypropylene, acrylic, nylon, and the like.

In addition, as shown in FIG. 1, the pouch type secondary battery 1000 according to the exemplary embodiment of the present invention is assembled so that the pouch type battery case 200 has the electrode assembly 100 accommodated therein but the first electrode tap 110 and the second electrode tap 120 over the sealing part 300 formed at an edge of the pouch type electrode case 200 are exposed to the outside.

In particular, the pouch type secondary battery 1000 according to the exemplary embodiment of the present invention includes an exhaust part 400 including exhaust members 410 and 420 inserted into a bonding surface of the sealing part 300 and formed to have adhesion weaker than that of the sealing part 300.

However, the exhaust part 400 is formed to have adhesion weaker than that of the sealing part 300 and maintains a basic adhesion of the battery case 200 but may have adhesion enough to release the sealing when the pouch type secondary battery is swollen due to the occurrence of high pressure within the battery under the overheating conditions such as overcharging, internal short, and the like, in the pouch type secondary battery 1000.

Further, the exhaust member may be a first exhaust member formed in a single layer of film type, wherein the first exhaust member is formed of modified propylene.

FIG. 2 is a side view showing a side on which the exhaust part 400 is formed, in the pouch type secondary battery 1000. In particular, FIG. 2 is a side view showing the pouch type secondary battery 1000 in which the exhaust part 400 including the first exhaust member 410 is formed.

As the exemplary embodiment of the present invention, the first exhaust member 410 is formed of modified polypropylene, wherein the modified polypropylene has adhesion weaker than that of polypropylene that is the sealing member 310.

Therefore, when the high pressure occurs within the battery due to the overheating condition such as overcharging, internal short, or the like, in the pouch type secondary battery 1000, the exhaust part 400 having adhesion weaker than that of the sealing part 300 is released to discharge an electrolyte or gas in the pouch type secondary battery 1000 to the outside, thereby preventing the pouch type secondary battery 1000 from being exploded or ignited.

Further, the adhesion of the exhaust part 400 is changed according to a formation area of the exhaust part 400 and therefore, the pressure releasing the sealing of the pouch type battery case 200 may be set by controlling the formation area of the exhaust part 400.

Further, a material forming the first exhaust member 410 may be modified polypropylene but may be variously changed without departing from the object of the present invention so that the exhaust part 400 has adhesion weaker than that of the sealing part 300.

Further, in another exemplary embodiment of the exhaust members 410 and 420, the exhaust members 410 and 420 include at least one exhaust layer 422 and an adhesive layer 421 disposed on the top and bottom portions of the exhaust layer to assist the adhesion of the exhaust layer and may be a second exhaust member 420 formed in a film type on which the exhaust layer 422 and the adhesive layer 421 are stacked.

Figure 3:
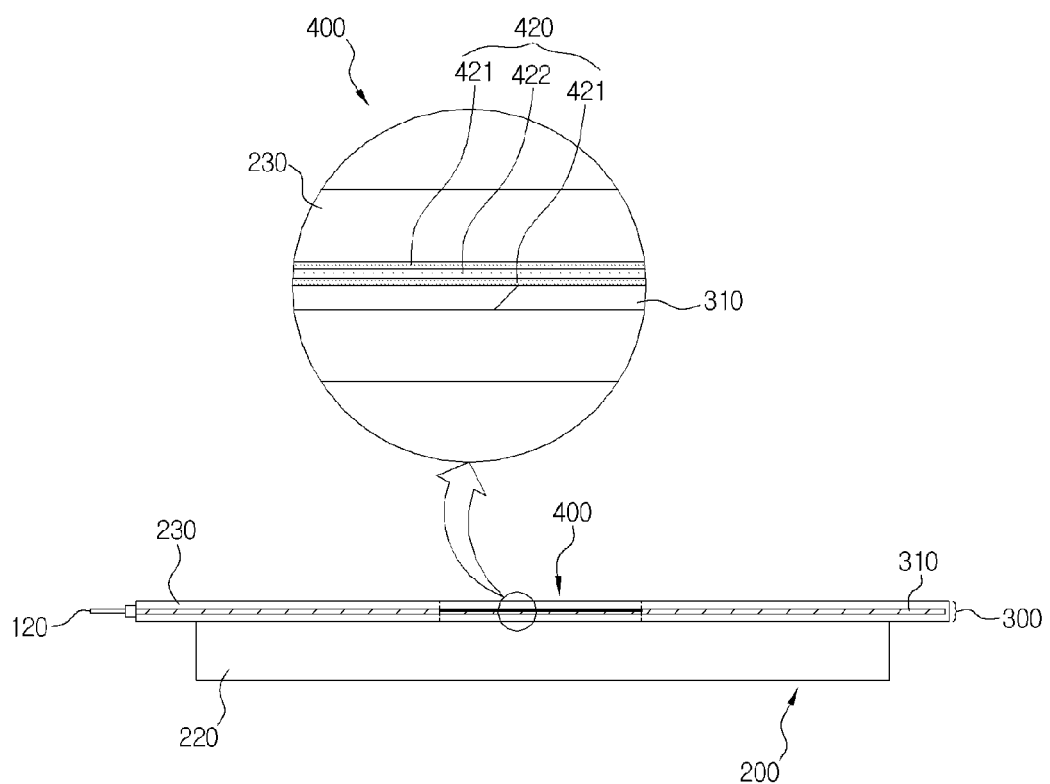
FIG. 3 is a side view showing a side on which an exhaust part is formed, in the pouch type secondary battery according to another exemplary embodiment of the present invention.

FIG. 3 is a side view showing a side on which the exhaust part 400 according to another exemplary embodiment is formed, in the pouch type secondary battery 1000. In particular, FIG. 2 is a side view showing the pouch type secondary battery 1000 in which the exhaust part 400 including the second exhaust member 420 is formed.

The second exhaust member 420 includes the plurality of adhesive layers 421 having adhesion weaker than that of the sealing member 310 and the exhaust layer 422 inserted among the plurality of adhesive layers 421 and having adhesion weaker than that of the adhesive layer 421.

According to the exemplary embodiment of the present invention, the exhaust layer 422 is formed of nonwoven fabric and the adhesive layer 421 is formed of polypropylene. As shown in FIG. 3, the second exhaust member 420 is formed in a form in which the two adhesive layers 421 and the exhaust layer 422 inserted between the two adhesive layers 421 are stacked.

In this case, the nonwoven fabric that is a material of the exhaust layer 422 does not have the adhesion even when heat is applied thereto and therefore, cannot be adhered to the pouch type battery case 200. The second exhaust member 420 is formed in a form in which the exhaust layer 422 inserted between the two adhesive layers 421 formed of polypropylene that is a material bondable with the pouch type battery case 200 is stacked.

In addition, the adhesive layer 421 of the exhaust member 420 is formed of polypropylene and may be variously changed without departing from the object of the present invention. Further, the exhaust layer 422 is formed of fabric, or the like, and may be variously changed without departing from the object of the present invention.

TABLE 1

|  | Sealing Member (Unit: N/10 mm) | Modified Propylene (Unit: N/10 mm) | Nonwoven (Unit: N/10 mm) |
|---|---|---|---|
| 1 | 83.175 | 53.4 | 29.275 |
| 2 | 82.875 | 55.125 | 29.25 |
| 3 | 87.35001 | 68.8 | 32.375 |
| Average | 84 | 59 | 30 |

Table 1 shows a result of testing the tensile force of the pouch type battery case 200 when the sealing is performed by inserting the sealing member thereinto, when the sealing is performed by inserting the modified polypropylene therein, and when the sealing is performed by inserting the nonwoven fabric thereinto. Table 1 shows results obtained by cutting the pouch type battery case 200 sealed through insertion of the sealing member, the modified polypropylene, and the nonwoven fabric at 10 mm and then, stretching it at 20 mm/min by using a tensile force measurement device.

It can be appreciated from Table 1 that the adhesion of the pouch type battery case 200 is strongest when the sealing member is inserted thereinto and the adhesion of the pouch type battery case 200 is stronger in an order of modified polypropylene and nonwoven fabric.

Therefore, when the exhaust members 410 and 420 are formed in a plurality of layers like the second exhaust member 420, there is an advantage in that a range in which the adhesion of the pouch type battery case 200 may be controlled can be expanded.

Figure 4:
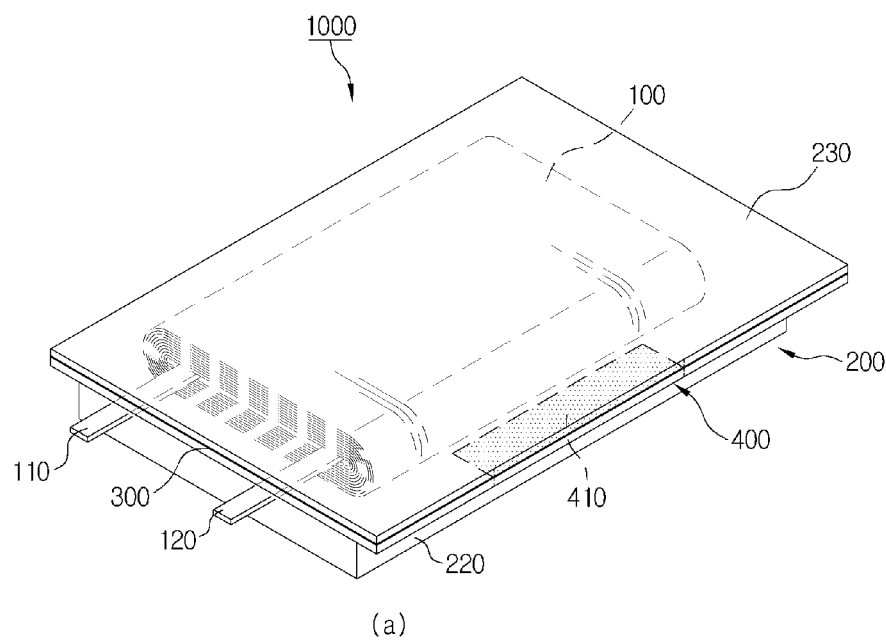
FIG. 4 is an operational status diagram when a swelling phenomenon of the pouch type secondary battery according to the exemplary embodiment of the present invention occurs.
Figure 4:
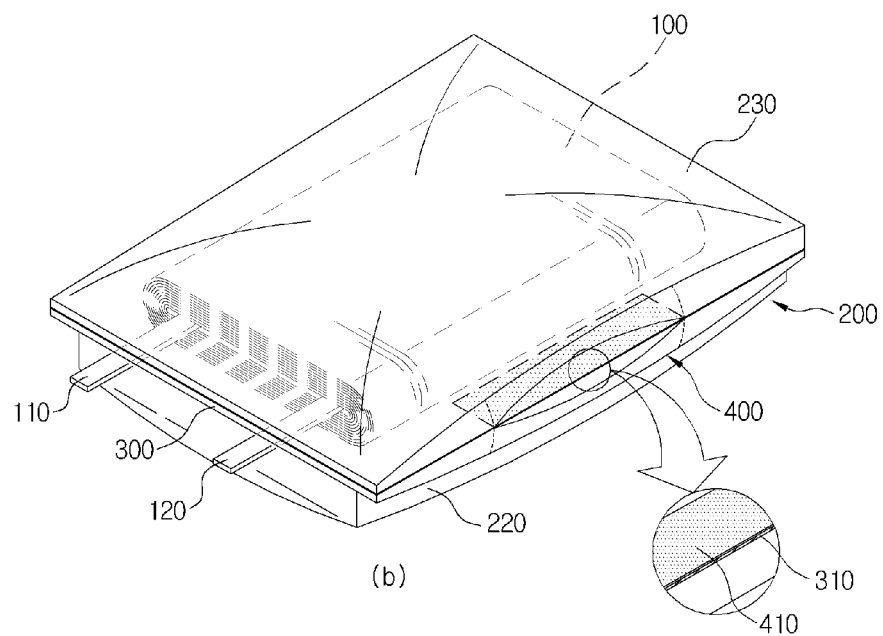

FIG. 4 is an operational status diagram when the swelling phenomenon of the pouch type secondary battery 1000 according to the exemplary embodiment of the present invention occurs. When the pressure in the pouch type secondary battery 1000 is increased under the overheating conditions such as overcharging, internal short, and the like and as a result, the swelling phenomenon occurs, the sealing of the exhaust part 400 is released and thus, the materials in the pouch type secondary battery 1000 may be discharged.

Further, as shown in FIGS. 1 to 4, the exhaust part 400 may be formed in one in a predetermined region of the bonding surface of the sealing part 300 formed at both edges adjacent to a side at which the first electrode tap 110 and the second electrode tap 120 of the pouch type battery case 200 are formed but the position and number thereof may be variously provided according to various types of the pouch type secondary battery 1000.

Figure 5:
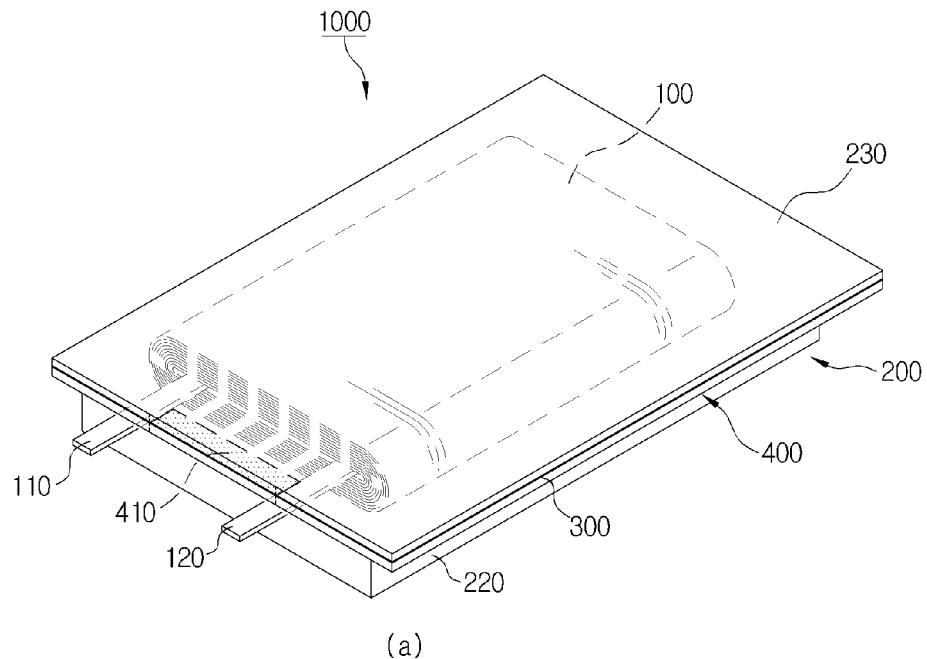
FIG. 5 is a perspective view showing the pouch type secondary battery according to the exemplary embodiment of the present invention having exhaust parts formed at various positions thereof.
Figure 5:
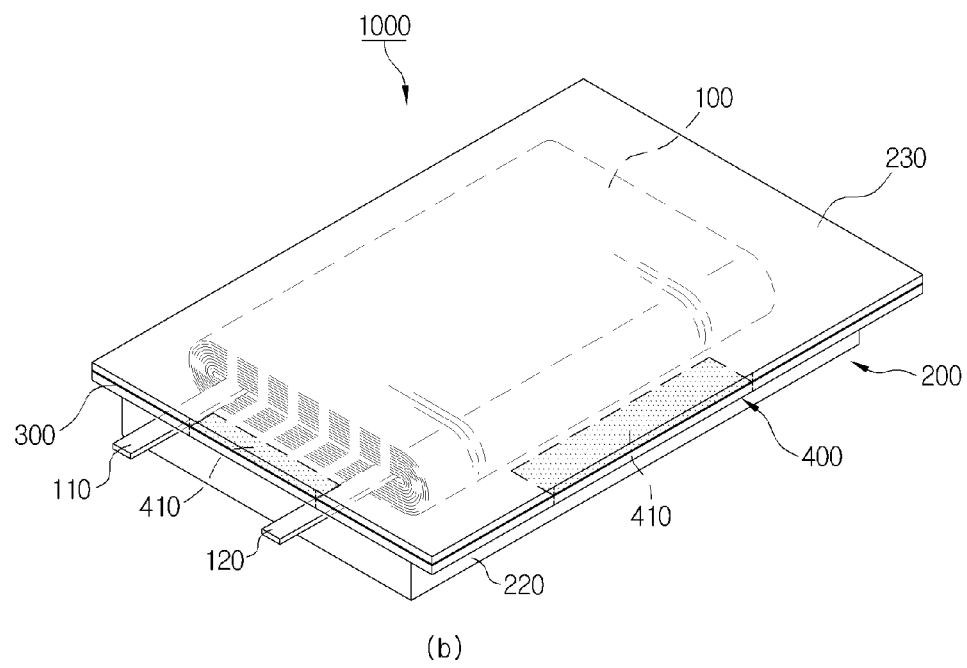

FIG. 5 is a perspective view showing the pouch type secondary battery 1000 in which the position and number of exhaust parts 400 are different. FIG. 5A is a perspective view showing that the exhaust part 400 is provided between the first electrode tap 110 and the second electrode tap 120 and FIG. 5B shows the pouch type secondary battery 1000 in which one exhaust part 400 is formed at both edges adjacent to a side at which the first electrode tap 110 and the second electrode tap 120 of the pouch type battery case 200 are formed and one exhaust part 400 is formed between the first electrode tap 110 and the second electrode tap 120 and the plurality of exhaust parts 400 are formed therebetween.

The position and number of exhaust parts 400 may be variously formed without departing from the object of the present invention in addition to one shown in FIG. 5.

As set forth above, the pouch type secondary battery according to the exemplary embodiments of the present invention can release the sealing of the exhaust part having a relatively weaker adhesion than that of the sealing part when the pouch type secondary battery is swollen due to high pressure generated within the secondary battery under the conditions of overheating, such as overcharging, internal short, and the like, thereby setting the discharge position and the discharge pressure of the pouch type secondary battery and discharging gas in the pouch type secondary battery to the outside so as to secure the safety of the pouch type secondary type.

Further, the pouch type secondary battery of the exemplary embodiments of the present invention can form the exhaust part including the exhaust member inserted into a predetermined region of the bonding surface of the sealing part and formed to have adhesion weaker than that of the sealing part to form discharge the materials in the pouch type secondary battery, thereby facilitating the manufacturing of the pouch type secondary battery and thus, little increasing the manufacturing costs thereof.

In addition, the pouch type secondary battery according to the exemplary embodiments of the present invention can discharge the electrolyte and gas therein by releasing the sealing of the pouch type battery case, thereby previously preventing the risk such as fire, explosion, or the like, due to the gas generation, the overheating, or the like, when the swelling phenomenon occurs.

The present invention is not limited to the above-mentioned exemplary embodiments but may be variously applied, and may be variously modified by those skilled in the art to which the present invention pertains without departing from the gist of the present invention claimed in the claims.

What is claimed is:

1. A pouch type secondary battery, comprising:
   an electrode assembly including a first electrode and a second electrode and a first electrode tap and a second electrode tap extending from the first electrode and the second electrode, respectively;
   a pouch type battery case having a cover and a body part;
   a sealing part having a sealing member to bond the cover to the body part so as to seal the pouch type battery case and provide an inner space part to the pouch type battery case, the electrode assembly being accommodated in the inner space part of the pouch type battery case with the first electrode tap and the second electrode tap exposed to the outside of the pouch type battery case; and
   an exhaust part disposed on the sealing member of the sealing part, the exhaust part having an exhaust member, wherein the exhaust member includes a first adhesive layer, an exhaust layer and a second adhesive layer stacked on the sealing member in the described order; and the exhaust part has a bonding strength weaker than that of the sealing member.

2. The pouch type secondary battery of claim 1, wherein the exhaust layer is formed of nonwoven fabric and the first and second adhesive layers are formed of polypropylene.

* * * * *